UNITED STATES PATENT OFFICE.

C. M. TESSIÉ DU MOTAY AND C. R. MARÉCHAL, OF METZ, FRANCE.

IMPROVEMENT IN BLEACHING ANIMAL AND VEGETABLE FIBERS.

Specification forming part of Letters Patent No. 57,649, dated August 28, 1866.

*To all whom it may concern:*

Be it known that we, CYPRIEN MARIE TESSIÉ DU MOTAY and CHARLES RAPHAEL MARÉCHAL, both of Metz, in the Empire of France, have invented certain new and useful Improvements in Bleaching Vegetable and Animal Fibers and Tissues, and in obtaining alkaline permanganates for this purpose; and we hereby declare the following to be a full, clear, and exact description of the same.

Fibers and tissues of vegetable or animal origin, such as oakum and cotton, woolen, linen, silk, and other stuffs, &c., bleach rapidly and without alteration, first, when they are soaked in liquids containing in solution superoxygenated acids or metallic salts, such as perchromic, permanganic, tungstic, chromic, manganic acids, or soluble perchromates, permanganates, tungstates, chromates, and manganates; second, where, after being taken out from any one of these liquids, they are plunged in acid water oxygenated, or in acid baths, which form, with the persalts or the metallic oxides with which the fibers are soaked and covered, a soluble salt less oxygenated—such as a hyposulphate of magnesia, for instance—when, after having been plunged in a bath of alkaline permanganate, they are steeped in a bath of water charged with sulphurous acid, &c.

The above-named fibers and tissues are bleached equally without alteration when, after having been soaked in the oxygenated acid water, they are plunged into liquids containing in solution acids or metallic salts which are either superoxygenated or capable of superoxygenating themselves.

The reaction of the baths, being able, as well as the reaction of the oxygenated acid water, to produce, with oxygenated or superoxygenated acids, salts, and metallic oxides, soluble salts less oxygenated, brings about a mutual decomposition of the elements brought together, and the fibers and tissues of vegetable or animal origin plunged into the baths where these reactions are engendered become decolorized, as by the contact with the active oxygen produced by the electric spark or by phosphorus.

Such are, in a general way, the reactions discovered by us, which can be practically employed in bleaching fibers or tissues of animal or vegetable origin.

It remains now to specify the method of employing the reactive substances which we make use of; but, before describing specially our method of operation, we desire it to be understood that we employ, in preference to all the other above-mentioned acids and metallic persalts, permanganic acid and alkaline permanganates, or alkaline earthy (*alkalino-terreux*) manganates, as being practically the most economical and chemically the most efficacious.

When we wish to bleach any of the vegetable fibers above mentioned or any other textile substance or vegetable origin, we clean them first in warm water; then we scour them in an alkaline wash or lye. We plunge them after this in a bath of water containing in solution, for one hundred kilograms of the substance to be bleached, from four to ten kilograms of permanganic acid or of the soluble permanganate. After this immersion, which should last for fifteen minutes at least and thirty minutes at most, we take out the substances to be bleached and put them either in a bath of water containing in solution from three to four per cent. of the peroxide of hydrogen and from two to three per cent. of hydrochloric acid, or in a bath of water saturated with sulphurous acid. The said substances are left in one or the other of these baths until the persalt with which they are soaked and the gum or lac (laque) of the oxide of manganese, which covers them are entirely dissolved, which will be in about thirty minutes. After this they are rinsed in fresh water, then washed in lye, and redipped, in the order above indicated, first, in the solution of permanganic acid or of the permanganate; second, in the bath of oxygenated acid water, or in the sulphurous-acid bath, and so on until perfectly bleached.

The bath (which contains, according to the quantity of coloring-matter to be removed from the substances to be bleached, from four to ten per cent. of permanganic acid or of permangate) is in general sufficient to entirely decolorize one hundred kilograms of woven or spun cotton, hemp, or flax. We employ the above-described method equally in bleaching the fibers and tissues of silk, wool, &c., with always this exception, that for this bleaching we employ exclusively, in place of the oxygenated water, sulphurous-acid liquid.

Having described our method of bleaching by the employment of alkaline manganates and alkaline earthy (*alkalino-terreux*) permanganates and permanganic acid, it remains for us to indicate the improved method by which these compounds may be produced, for up to the present time these reactive substances have been produced at prices so high that it has been impossible to employ them for purposes of bleaching.

The method which we are about to describe of producing the manganates and permanganates is then the necessary complement of the process of bleaching just described.

It is known that water employed in excess will change or separate alkaline manganates into permanganates free bases (*bases libres*) and peroxide of manganese—as, for example, $3(NaO,MnO^3) + 2HO = NaO,Mn^2O^7 + Mn^0O^2 + 2(NaO,HO.)$ It is equally well known that the diluted acids transform the manganates into permanganates—as, for example, $5(NaO,MnO^3) + 4(CO^2) = MnO,CO^2 + 3(NaO,CO^2) + 2(MnO^7, NaO.)$ But it is also known that the permanganates thus generated, being, as soon as generated, dissolved in a large quantity of water, must be evaporated, either in order to be brought back to a crystallized state or to be employed in concentrated solutions, and that every evaporation destroys a considerable proportion of these compounds. This being the case, we have sought, first, if other bodies than water will not be able to produce in concentrated solutions of soluble manganates a change the effect of which would be to transform the manganates to permanganates; second, if the transformation of the said manganates into permanganates could not be made at the pulpy or pasty state, becoming dry at the ordinary temperature; and we have found, first, that, in place of water as an agent for effecting the transformation, there may be successfully substituted in highly-concentrated solutions of alkaline manganates either sulphates of lime or of magnesia or chlorides or carbonates or bicarbonates of these bases. Upon contact with these salts the manganates are rapidly transformed and permanganated—as for example, $3(KoMnO^3) + 2(MgO,SO^3) = KoMn^2O^7 + MnO^2 + 2(KoSO^3) + 2(MgO,HO;)$ that analogous reactions are produced when the soluble manganates are triturated in presence of a very limited quantity of water, either with sulphates of lime or magnesia, or with the chlorides, or with the carbonates and bicarbonates of these bases, but that, in this case, the reaction is much more perfect when effected in a current of carbonic acid employed until the paste is desiccated at a temperature which may vary, without inconvenience, from 15° to 40° centigrade.

Having described our invention, what we claim, and desire to secure by Letters Patent, is—

1. The method of bleaching vegetable and animal fibers and tissues by the employment of manganates, permanganates, and permanganic acid, substantially as herein described.

2. The method of producing the said manganates and permanganates, substantially as herein shown and described.

In testimony whereof we have signed our names to this specification before two subscribing witnesses.

C. TESSIÉ DU MOTAY.
C. R. MARÉCHAL.

Witnesses:
A. BLÉTRY,
F. F. RANDOLPH.